(12) United States Patent
Mizumoto et al.

(10) Patent No.: US 8,005,322 B2
(45) Date of Patent: Aug. 23, 2011

(54) POLARIZATION-INDEPENDENT OPTICAL ISOLATOR

(75) Inventors: Tetsuya Mizumoto, Tokyo (JP); Yuya Shoji, Tokyo (JP)

(73) Assignee: Tokyo Insititute of Technology, Tokyo (JP)

( * ) Notice: Subject to any disclaimer, the term of this patent is extended or adjusted under 35 U.S.C. 154(b) by 0 days.

(21) Appl. No.: 12/225,349

(22) PCT Filed: Mar. 16, 2007

(86) PCT No.: PCT/JP2007/056114
§ 371 (c)(1),
(2), (4) Date: Jul. 27, 2010

(87) PCT Pub. No.: WO2007/108544
PCT Pub. Date: Sep. 27, 2007

(65) Prior Publication Data
US 2011/0019958 A1    Jan. 27, 2011

(30) Foreign Application Priority Data
Mar. 20, 2006   (JP) .................................. 2006-075854

(51) Int. Cl.
*G02B 6/00*    (2006.01)
*G02B 6/12*    (2006.01)

(52) U.S. Cl. .................. 385/11; 385/2; 385/14; 385/15; 385/42; 385/31; 285/27; 285/28

(58) Field of Classification Search .................... 385/11, 385/14, 15, 39, 40, 42, 31, 30, 1, 2, 3, 27, 385/28, 29
See application file for complete search history.

(56) References Cited

U.S. PATENT DOCUMENTS

| 5,428,695 | A  | * | 6/1995  | Ohta ................................. 385/14 |
| 5,768,005 | A  | * | 6/1998  | Cheng et al. ................... 359/281 |
| 5,848,203 | A  | * | 12/1998 | Kawakami et al. ............. 385/11 |
| 5,905,823 | A  | * | 5/1999  | Shintaku et al. ................ 385/11 |
| 6,091,866 | A  | * | 7/2000  | Cheng ............................. 385/11 |
| 6,947,619 | B2 | * | 9/2005  | Fujita et al. ..................... 385/11 |
| 2002/0097946 | A1 | * | 7/2002 | Fujita et al. ..................... 385/11 |
| 2011/0019958 | A1 | * | 1/2011 | Mizumoto et al. .............. 385/11 |

FOREIGN PATENT DOCUMENTS

JP   3407046 B1   10/2003

OTHER PUBLICATIONS

O. Zhuromskyy et al; Magnetooptical Waveguides With Polarization-Independent Noreciprocal Phaseshift; IEEE Journal of Lightwave Technology; vol. 19, No. 2, Feb. 2001.
J.Z. Huang et al; Realization of a Compact and Single-Mode Optical Passive Polarization Converter; IEEE Photonics Tech. Letters, vol. 12, No. 3, Mar. 2000.
J.Fujita; Polarization-Independent Waveguide Optical Isolator Based on Nonreciprocal Phase Shift; IEEE Photonics Tech. vol. 12, No. 11, Nov. 2000.

(Continued)

*Primary Examiner* — Brian M Healy
(74) *Attorney, Agent, or Firm* — Holtz, Holtz, Goodman & Chick PC

(57) ABSTRACT

It is provided a polarization-independent optical isolator without depending on the polarized wave of the light being input to the waveguide-type optical isolator, in particular, it is able to completely isolate the propagating light of the backward direction.

6 Claims, 7 Drawing Sheets

OTHER PUBLICATIONS

O. Zhuromskyy et al; Analysis of Polarization Independent Mach-Zehnder-Type Integrated Optical Isolator; Journal of Lightwave Tech. vol. 17, No. 7, Jul. 1999.

H. Yokoi et al; Demonstration of an Optical Isolator With a Semiconductor Guiding Layer That Was Obtained by Use of a Nonreciprocal Phase Shift; Applied Optics; Nov. 2000, vol. 39, No. 33.

H. Yokoi et al; Demonstration of Optical Isolator With Semiconductor Guiding Layer; Institute of Electronics; Technical Report of IEICE; May 2000.

T. Mizumoto et al; Nonreciprocal Propagation Characteristics of YIG Thin Film; IEEE Transactions on Microwave Theory and Techniques; vol. MTT-30, No. 6, Jun. 1982.

* cited by examiner

FORWARD PROPAGATING WAVE (IN-PHASE INTERFERENCE)
Phase Difference= $\pi/2$ (Optical Path Difference) $- \pi/2$ (Non-Reciprocal) =0

BACKWARD PROPAGATING WAVE (OUT-OF-PHASE INTERFERENCE)
Phase Difference= $\pi/2$ (Optical Path Difference) $+ \pi/2$ (Non-Reciprocal) = $\pi$

| measurement of W [μm] | 4.85 | 1.85 | 1.65 | 1.35 | 1.20 |
|---|---|---|---|---|---|
| mode conversion efficiency [%] | 2.4 | 14 | 5.1 | 3 | 1.9 |

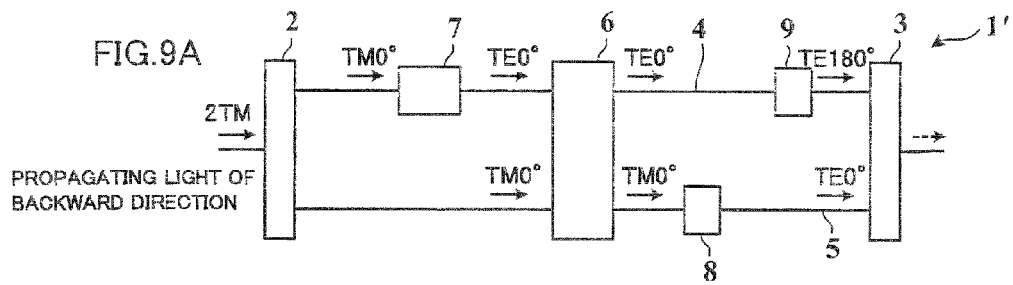
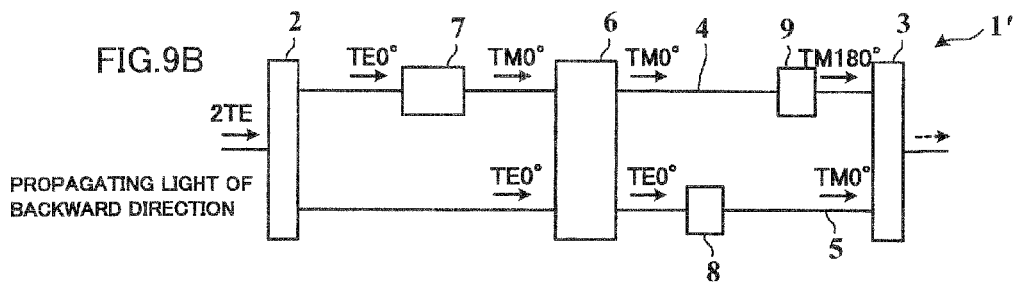
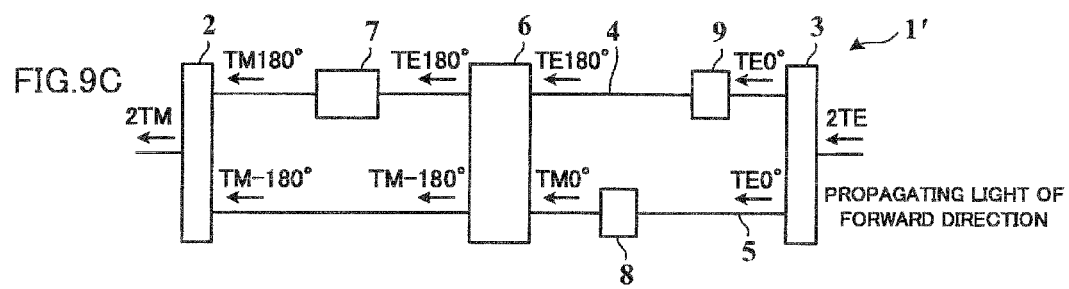
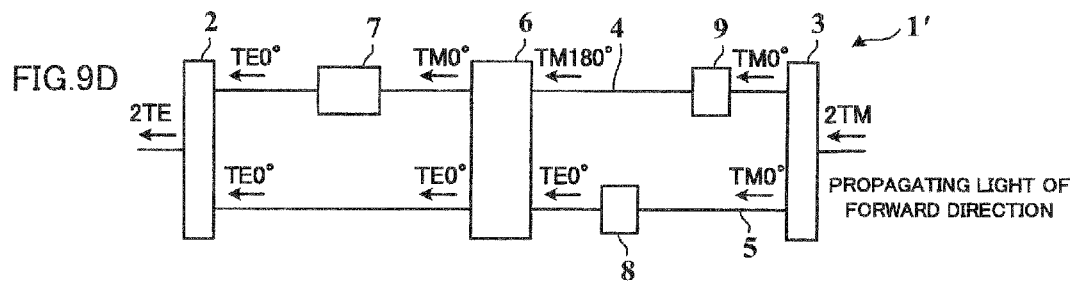

POLARIZATION-INDEPENDENT OPTICAL ISOLATOR

This application is a U.S. National Phase Application under 35 USC 371 of International Application PCT/JP2007/056114 filed Mar. 16, 2007.

BACKGROUND OF THE INVENTION

1. Technical Field

The present invention relates to a polarization-independent optical isolator, and more particularly, relates to a polarization-independent optical isolator that allows for the isolation of both TM-mode and TE-mode, as well as for the completely preventing any propagation to the backward propagating light in a designed wavelength.

2. Prior Art

An optical isolator is an element which allows a light to transmit only in one direction but prevents the light from propagating in a direction opposite thereto. For example, by arranging the optical isolator at an emitting end of a semiconductor laser, the light output from the laser transmits through the optical isolator, and it is possible to be used the light as a light source for optical fiber communications. Conversely, the light which is going to be input on the semiconductor laser through the optical isolator is prevented by the optical isolator, so that the light cannot be input on the semiconductor laser. Unless the optical isolator is placed at the emitting end of the semiconductor laser, a reflected return light will be incident on the semiconductor laser, and thereby a degradation of oscillation characteristics of the semiconductor laser is caused. Namely, the optical isolator serves to block the light which is going to be incident on the semiconductor laser, and to maintain a stable oscillation without degrading the characteristics of the semiconductor laser.

In optical active elements such as not only the aforementioned semiconductor laser but also an optical amplifier or the like, by unintentional incidence of light from an opposite direction, operating characteristics of the optical active elements may be degraded or unintentional operation may be performed. However, since the optical isolator allows the light to transmit only in one direction, it is possible to prevent the unintentional backward light from being incidence of to the optical active element.

Conventionally, an interference-type optical isolator (waveguide-type optical isolator) 101 shown in FIG. 1 with the perspective view has been proposed as an optical isolator suitable for integration with a semiconductor laser.

The above conventional optical isolator 101 is constituted that a waveguide layer 103 using a semiconductor material is provided on a compound semiconductor substrate 102, a waveguide 104 is formed in the waveguide layer 103, a tapered branching/coupling device 105 is provided on the waveguide layer 103, and further a non-reciprocal phase shifter 106 is provided on the waveguide layer 103. Incidentally, the non-reciprocal phase shifter 106 is provided with a cladding layer 107 composed of a magneto-optical material, and magnetic field applying means 108 for completing magnetization of the magneto-optical material in a predetermined direction, and the non-reciprocal phase shifter 106 is formed that the magnetic field applying means 108 is provided on the cladding layer 107.

FIGS. 2A-2C show an operating principle of the waveguide-type optical isolator 101. The optical isolator 101 (hereinafter, referred to as "waveguide-type optical isolator 101") is set so that light waves which propagate in two optical waveguides may be in same phase to propagating waves of a forward direction (forward propagating waves) and may be in opposite phases to propagating waves of backward direction (backward propagating waves) which propagate in an opposite direction, by utilizing a phase variation (hereinafter, referred to as "non-reciprocal phase shifting effect") whose magnitude is different depending on a propagation direction generated in two optical waveguides constituting an optical interferometer (refer to FIG. 2A).

In a case where two light waves are in the same phases, the light waves which input from a central input end 110 is output from a central output end 111 in a tapered branching/coupling device 105 provided on the output side (on the right-hand side in FIG. 1) based on a symmetry of the structure (refer to FIG. 2B).

Meanwhile, in a case where two light waves are in opposite phases, from the symmetry of the structure, since an antisymmetric distribution is formed in the tapered branching/coupling device 105 provided on the input side (in the left-hand side in FIG. 1), the light waves input from a central output end (reflected return light) are not output from the central output end (input end) 110 of the tapered branching/coupling device 105 but are output from undesired light output ends 112 provided on both sides of the central output end 110 (refer to FIG. 2C).

That is, the light wave input from the central input end 110 of the tapered branching/coupling device 105 on the left-hand side in FIG. 1 is output from the central output end 111 of the tapered branching/coupling device 105 on the right-hand side in FIG. 1. Conversely, the light wave input from the central output end 111 of the tapered branching/coupling device 105 on the right-hand side in FIG. 1 is output from the waveguides on the left-hand side in FIG. 1 without entering to the central input end 110 of the tapered branching/coupling 105 on the left-hand side in FIG. 1. As described above, by setting so that two light waves are in opposite phases to a propagating light of the backward direction (hereinafter, referred to as "backward propagating light"), it is possible to isolate the backward propagating light input from the central output end of the branching/coupling device on the right-hand side in FIG. 1.

In order to achieve an operation of branching and coupling characteristics of such a light of the optical isolator, a constant amount of the non-reciprocal phase shifting effect is required. First of all, one of the interfering optical paths is made longer than the other one, and thereby a phase difference independent of the propagating direction between the two optical paths (reciprocal phase difference) is generated. The non-reciprocal phase shifting effect can be generated by arranging a magneto-optical material (material having a magneto-optical effect) in a planar waveguide, externally applying a magnetic field in a direction perpendicular to a propagating direction (transverse direction) in a waveguide plane, and orienting magnetization of the magneto-optical material. Since the non-reciprocal phase shifting effect due to the magneto-optical effect is determined by the relationship between the propagating direction of the light and an orientation direction of the magnetization, the non-reciprocal phase shifting effect is different in a case where the propagating direction is reversed while keeping a magnetizing direction.

Since the magnetic fields are applied in an antiparallel to each other to two waveguides constituting the interferometer in the waveguide-type optical isolator shown in FIGS. 2A-2C, a phase difference of the light waves when each light waves propagate the same distance in two waveguides corresponds to an amount of non-reciprocal phase shifting (difference of the phase variation between the forward propagating wave and the backward propagating wave). Additionally, if a phase difference "+φ" occurs between two waveguides due to the non-reciprocal phase shifting effect to the forward propagating wave, a phase difference "−φ" which is an opposite sign to that will occur to the backward propagating wave.

In addition to the non-reciprocal phase shifting effect caused by the magnetic field, an optical path length difference corresponding to ¼—wavelength is provided in two waveguides constituting the interferometer. It is intended that the light which propagates through a waveguide with longer optical path gives a phase variation which is larger only "π/2" regardless of the direction. Namely, if the waveguide with longer optical path is made to generate a phase difference due to the non-reciprocal phase shifting effect (hereinafter, referred to as "non-reciprocal phase shifting phase difference") of "−π/2" as compared with a waveguide with shorter optical path to the forward propagating wave, the light waves which propagate through two waveguides are in the same phase to the forward propagating wave. At this time, since the sign of the non-reciprocal phase shifting phase difference is reversed when the propagation direction is reversed, the non-reciprocal phase shifting phase difference "+π/2" is given to the waveguide with longer optical path. This phase difference and the phase difference "+π/2" due to the optical path length difference are added, so that the light will input into the tapered branching/coupling device in the opposite phase state (phase difference π). From the discussion described above, it can be concluded that the non-reciprocal phase shifting phase difference "π/2" is required in the waveguide-type optical isolator shown in FIGS. 2A-2C.

In such a conventional waveguide-type optical isolator, since the characteristic vary significantly according to the polarization state of the input light, a conventional waveguide-type optical isolator has a polarization dependence that operates as an isolator in an only case where the polarized wave of the input light is single polarized wave of the specific case (TM-mode, vertically-polarized wave). Incidentally, an example of such a waveguide-type optical isolator is disclosed in Japanese Patent No. 3407046. In addition, operational verification examples of a waveguide-type optical isolator in the TM-mode are described in Non-Patent Document 1 and Non-Patent Document 2. Furthermore, Non-Patent Document 3 demonstrates by the experiments that the non-reciprocal phase shifting effect is not generated in the TE-mode by measuring the amount of non-reciprocal phase shift generated to the TM-mode.

However, considering the fact that the optical isolator is used in the optical fiber communications, the polarization state of the light wave transmitted through a fiber changes randomly. Therefore, in an optical isolator having the polarization dependence, the utilizable range is limited. In particular, the preventing characteristics (isolation characteristics) of the backward propagating light are important characteristics in use, and for the above reason, it is required that sufficiently large preventing characteristics is obtained.

In this connection, a polarization-independent waveguide-type optical isolator, in which the magnetization structure of the magnetic garnet is schemed, is proposed in Non-Patent Document 4. However, the optical isolator has a configuration that the control of the magnetization structure is complicated and difficult.

With regard to a bulk-type optical isolator, a polarization-independent bulk-type optical isolator having a polarization diversity (polarization separation and composition) configuration is proposed in Non-Patent Document 5.

A waveguide-type optical isolator utilizing the polarization diversity can also be considered, but it is necessary to separate the input light into the TE-mode (horizontally-polarized Wave) and the TM-mode, and thereafter to rotate polarization plane 90 degrees to the TE-mode and pass through an optical isolator, and to output by further rotating a polarization plane and put it back in place. In this case, two waveguide-type optical isolators are required, and thereby it is caused the seriously reversing consequence to the current requirement specifications which downsize the optical isolator. Therefore, it is scarce of practicality.

Further, Non-Patent Document 6 clarifies a good mode conversion characteristics by prototyping a TE-TM mode converter in an asymmetric-type waveguide structure.

Prior Art Document:

[Non-Patent Document 1]
H. Yokoi, T. Mizumoto, N. Shinjo, N. Futakuchi, and Y. Nakano, "Demonstration of optical isolator, with a semiconductor guided layer that was obtained by use of a non-reciprocal phase shift," Applied Optics, vol. 39, No. 33, pp. 6158-6164 (2000).

[Non-Patent Document 2]
H. Yokoi, T. Mizumoto, N. Shinjo, N. Futakuchi, Y. Nakano, "Demonstration of an optical isolator with semiconductor guided layer," Technical report of IEICE, OPE2000-10, pp. 55-60 (2000).

[Non-Patent Document 3]
T. Mizumoto and Y. Naito, "Non-reciprocal propagation characteristics of YIG thin film," IEEE Trans. on Microwave Theory and Techniques, vol. MTT-30, No. 6, pp. 922-925 (1982).

[Non-Patent Document 4]
O. Zhuromskyy, H. Deoetsch, M. Lohmeyer, L. Wilkens, and P. Hertel, "Magneto-optics waveguide with polarization-independent non-reciprocal phase shift," IEEE J. Lightwave Technology, vol. 19, No. 2, pp. 214-221 (2001).

[Non-Patent Document 5]
K. Shiraishi, "New configuration of polarization-independent isolator using a polarization-dependent one," Electronics Letters, vol. 27, No. 4, pp. 302-303 (1991).

[Non-Patent Document 6]
J. Z. Huang, R. Scarmozzino, G. Nagy, M. J. Steel, and R. M. Osgood, Jr., "Realization of a compact and single-mode optical passive polarization converter," IEEE Photonics Technology Letters, vol. 12, No. 3, pp. 317-319 (2000).

SUMMARY OF THE INVENTION

The present invention is developed in consideration of the aforementioned problems. Therefore, the object of the present invention is to provide a polarization-independent optical isolator which can, in particular, certainly isolate the backward propagating light without depending on the polarized wave of the light being input in the waveguide-type optical isolator.

The present invention relates to a polarization-independent optical isolator, and the aforementioned object of the present invention is achieved by a polarization-independent optical isolator comprising a first branching/coupling device and a second branching/coupling device; a first waveguide and a second waveguide which are respectively connected to the first branching/coupling device and the second branching/coupling device; a non-reciprocal phase shifter which is provided so as to straddle on the first waveguide and the second waveguide, and which gives a prescribed phase difference to a propagating light of a forward direction (hereinafter, referred to as "forward propagating light") and a backward propagating light respectively propagating in the first and second waveguides; a first mode converter provided on the first waveguide; and a second mode converter provided on the second waveguide; wherein the second mode converter is provided between the non-reciprocal phase shifter and the second branching/coupling device in a case where the first mode converter is provided between the first branching/coupling device and the non-reciprocal phase shifter, the second mode converter is provided between the non-reciprocal phase shifter and the first branching/coupling device in a case where the first mode converter is provided between the second branching/coupling device and the non-reciprocal phase shifter.

In addition, the aforementioned object of the present invention is effectively achieved by providing the polarization-independent optical isolator, wherein the prescribed phase difference of the non-reciprocal phase shifter is expressed as $\phi_{TE}-\phi^f_{TM}=2$ m$\pi$ ("m" is an integer) and $\phi_{TE}-\phi^b_{TM}=(2n+1)\pi$ ("n" is an integer), in a case where a phase variation of a TE-mode to the forward propagating light is "$\phi_{TE}$", and a phase variation of a TM-mode to the forward propagating light is "$\phi^f_{TM}$", and in a case where a phase variation of a TE-mode to the backward propagating light is "$\phi_{TE}$", and a phase variation of a TM-mode to the backward propagating light is "$\phi^b_{TM}$".

Further, the aforementioned object of the present invention is effectively achieved by providing the polarization-independent optical isolator, wherein a reciprocal phase shifter is provided to either the first waveguide or the second waveguide, and a prescribed phase difference is given to the propagating light passing through the reciprocal phase shifter.

Further, the aforementioned object of the present invention is effectively achieved by providing the polarization-independent optical isolator, wherein the prescribed phase difference of the reciprocal phase shifter is $(2l+1)\pi$ ("l" is an integer).

Furthermore, the aforementioned object of the present invention is effectively achieved by providing the polarization-independent optical isolator, wherein the prescribed phase difference of the non-reciprocal phase shifter is expressed as $\phi_{TE}-\phi^f_{TM}=(2m+1)\pi$("m" is an integer) and $\phi_{TE}-\phi^b_{TM}=2n\pi$, ("n" is an integer), in a case where a phase variation of the TE-mode to the forward propagating light is "$\phi_{TE}$", and a phase variation of the TM-mode to the forward propagating light is "$\phi^f_{TM}$", and in a case where a phase variation of the TE-mode to the backward propagating light is "$\phi_{TE}$", and a phase variation of the TM-mode to the backward propagating light is "$\phi^b_{TM}$".

EFFECTS OF THE INVENTION

According to the polarization-independent optical isolator of the present invention, a polarization-independent waveguide-type optical isolator is realized with one optical isolator without the need to separate the conventional waveguide-type optical isolator which operates only for a single polarized wave (TM-mode) per polarized wave. In particular, in a case where the operation of the mode converter is complete, regardless of the type of input polarized wave, it is possible to provide a polarization-independent optical isolator which the forward propagating light can be propagated with lossless, meanwhile the backward propagating light isolates completely.

Further, even if in a case where the operation of the mode converter is incomplete, that is, in a case where both the conversion efficiency from the TE-mode to the TM-mode and the conversion efficiency from the TM-mode to the TE-mode are "$\eta$" ($\eta<1$), it is possible to provide a polarization-independent optical isolator which completely isolates the backward propagating light regardless of the input polarized wave.

Furthermore, by proposing the polarization-independent optical isolator according to the present invention, since it is possible to provide the polarization-independent optical isolator with only one the waveguide-type optical isolator which provides mode converter within the waveguide in compared with the polarization-independent waveguide-type optical isolator utilized the polarization diversity, it can realize the downsizing by integration.

BRIEF DESCRIPTION OF THE DRAWINGS

For a better understanding of the present invention, reference is made of a detailed description to be read in conjunction with the accompanying drawings, in which:

FIGS. 9A-9D are schematic views showing one example of the process when light is input in the polarization-independent optical isolator according to an alternative example of the present invention.

DESCRIPTION OF THE PREFERRED EMBODIMENTS

Hereinafter, the polarization-independent optical isolator according to the present invention will be described in detail with reference to the drawings.

Figure 1:
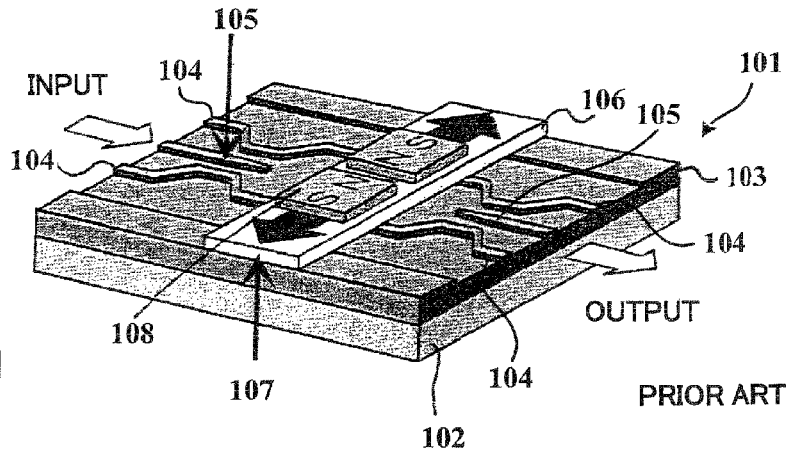
FIG. 1 is a perspective view showing an example of a conventional interference-type optical isolator.
Figure 2A:
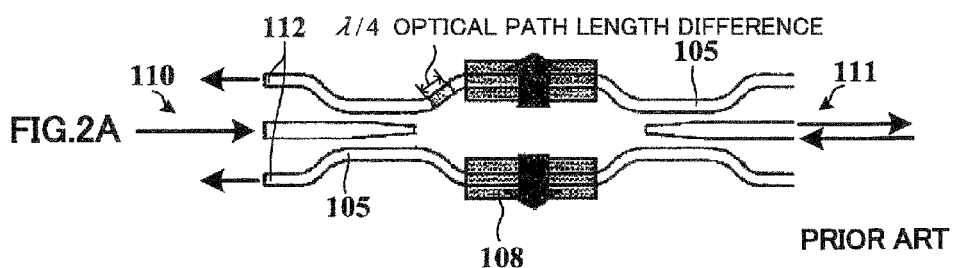
FIGS. 2A-2C are schematic illustrations of the operating principles of the interference-type optical isolator.
Figure 2B:
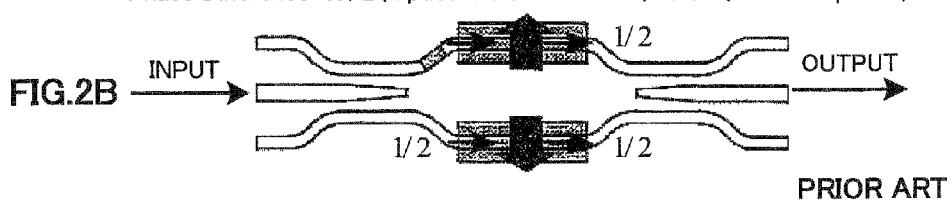
Figure 2C:
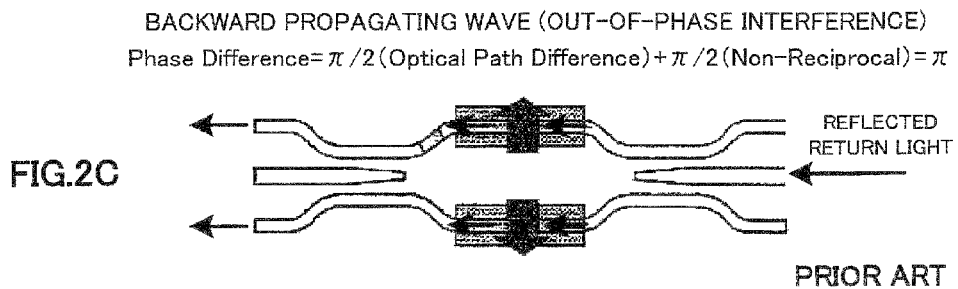
Figure 3:
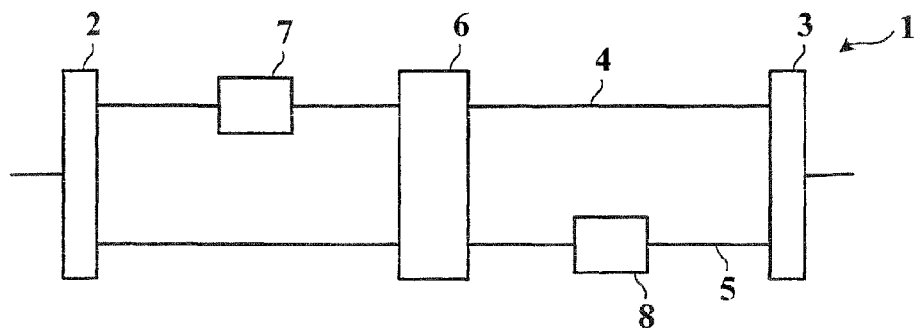
FIG. 3 is a schematic view showing one example of a structure of the polarization-independent optical isolator according to the present invention.

FIG. 3 is a schematic view showing one example of a structure of the polarization-independent optical isolator according to the present invention. As shown in FIG. 3, the polarization-independent optical isolator 1 is constituted by comprising at least a first branching/coupling device 2, a second branching/coupling device 3, a first waveguide 4, a second waveguide 5, a non-reciprocal phase shifter 6, a first mode converter 7 and a second mode converter 8.

The first branching/coupling device 2 and the second branching/coupling device 3 are designed to branch or couple the input light. It is possible to use a tapered branching/coupling device, a Y-type branching/coupling device, a multimode interference coupling device (MMI coupler) using a multimode interference effect, or the like as the branching/coupling devices 2 and 3. The tapered branching/coupling device is utilizing coupling distributing occurred in the propagating direction of the light by arranging closely several waveguides, and the multimode interference coupler is using multimode interference efficiency.

Incidentally, the first branching/coupling device 2 and the second branching/coupling device 3 are not designed to separate the input light into polarized wave of a TE-mode and polarized wave of a TM-mode, but it is designed to branch the input light including both polarized waves of the TE-mode and TM-mode into two light waves with the same phase and the same amplitude. In other words, the branching/coupling devices 2 and 3 perform the operation to branch an input light having an amplitude "a" into light waves having an amplitude "a/2" in the first waveguide 4 and the second waveguide 5.

The first waveguide 4 and the second waveguide 5 are respectively connected so as to join the first branching/coupling device 2 and the second branching/coupling device 3, and thereby the light is guided.

The non-reciprocal phase shifter 6 is designed to give a prescribed phase difference (phase variation) to the forward propagating light and the backward propagating light guiding through the first waveguide 4 and the second waveguide 5. In the polarization-independent optical isolator 1, the non-reciprocal phase shifter 6 is provided on the first waveguide 4 and the second waveguide 5 and so as to straddle the first waveguide 4 and the second waveguide 5.

In a case where the phase variation of the TE-mode to the forward propagating light in the designed wavelength is "$\phi^f_{TM}$", and the phase variation of the TM-mode to the forward propagating light in the designed wavelength is "$\phi^f_{TM}$", the phase variation of the TE-mode to the backward propagating light in the designed wavelength is "$\phi_{TE}$", further the phase variation of the TM-mode to the backward propagating light in the designed wavelength is "$\phi^b_{TM}$", the prescribed phase difference given by the non-reciprocal phase shifter 6 is expressed as follows:

$$\phi_{TE} - \phi^f_{TM} = 2m\pi \text{ ("m" is an integer)} \quad (1)$$

$$\phi_{TE} - \phi^b_{TM} = (2n+1)\pi \text{ ("n" is an integer)} \quad (2)$$

Incidentally, in this embodiment, "n=m" may be allowed.

Furthermore, in the non-reciprocal phase shifter 6 used in the polarization-independent optical isolator 1, a phase difference 0° is given between the polarized wave of the TE-mode of the forward propagating light and the polarized wave of the TM-mode of the forward propagating light, and a phase difference "$-\pi$" is given between the polarized wave of the TE-mode of the backward propagating light and the polarized wave of the TM-mode of the backward propagating light. Hereinafter, the polarized wave of the TM-mode is simply referred to as "TM-mode" and the polarized wave of the TE-mode is simply referred to as "TE-mode".

Such a non-reciprocal phase shifter 6 can be formed by using a garnet having a magneto-optical effect (magneto-optical garnet) in the waveguide within the optical fiber communication waveband (refer to Non-Patent Document 3).

In other words, the non-reciprocal phase shifter 6 can be formed by constituting a waveguide layer with the magneto-optical garnet. Alternatively, the non-reciprocal phase shifter 6 can also be formed by a waveguide configuration wherein a "GaInAsP" which is crystal grown on a compound semiconductor substrate (for example, an "InP" substrate) is used as a waveguide layer, and there a magneto-optical garnet is joined as a cladding layer onto the waveguide layer using a technique such as direct bonding or the like. Incidentally, $Y_3Fe_5O_{12}$ (YIG), $(BiY)_3Fe_5O_{12}$(Bi:YIG), and $(CeY)_3Fe_5O_{12}$(Ce:YIG) or the like is used as an example of the magneto-optical garnet.

The first mode converter 7 and the second mode converter 8 are designed for performing the mode conversion of the polarized wave of the light. In other words, it is designed for converting the TM-mode into the TE-mode, or for converting the TE-mode into the TM-mode.

The polarization-independent optical isolator 1 according to the present invention is a waveguide-type optical isolator, and the first mode converter 7 and the second mode converter 8 are waveguide-type mode converters. With respect to the configuration method of such a waveguide-type mode converter, there is a method in which the cross sectional shape of the waveguide is formed into an asymmetric shape to the biaxial, and thereby a configuration birefringence characteristic is created, and the TE-TM mode conversion is generated by the configuration birefringence characteristic (refer to Non-Patent Document 6). By using this configuration method, a mode converter can be formed in the waveguide using any material or combination of materials.

Figure 4:
FIG. 4 is a picture showing one example of the cross-sectional shape of a waveguide in which a mode converter is formed by etching.
Figures 5, 6:
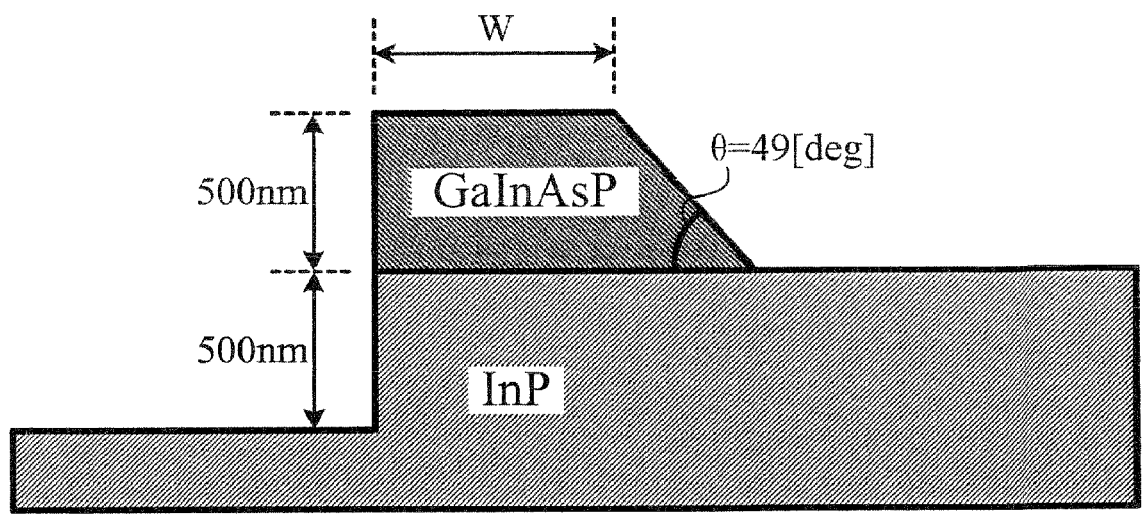
FIG. 5 is a schematic cross-sectional view showing one example of waveguide in which a mode converter is formed by etching.
FIG. 6 is a table showing one example of relationship between the mode converter and the mode conversion efficiency.

An example of the mode converter formed by this configuration method shows in FIG. 4 and FIG. 5. More specifically, FIG. 4 is a picture showing the cross-sectional shape of the waveguide in which a mode converter is formed by etching in accordance with the above-described configuration method, and FIG. 5 is a schematic cross-sectional view of a waveguide in which a mode converter is formed. Besides, the mode converters shown in FIG. 4 and FIG. 5 use an "InP" substrate as the substrate. The material "GaInAsP" (bandgap wavelength $\lambda_g$=1250 nm) made crystal grow a semiconductor material on the substrate is used as a waveguide layer, and furthermore a cladding layer is formed on the waveguide layer, and thereby the cladding layer is used as an aerial waveguide.

In addition, the mode converters 7 and 8 have conversion characteristics (conversion efficiency). A table shown in FIG. 6 shows an example of the relationship between the width (W) of the top surface part of the mode converter and the mode conversion efficiency (%). The mode conversion efficiencies (%) in FIG. 6 are actual measurements of the percentage of the power of the TM-mode being output from the mode converter in cases where the wavelength is set to 1550 nm, and the TE-mode is converted into the TM-mode.

Incidentally, in FIG. 3, the first mode converter 7 is provided on the first waveguide 4, and provided between the first branching/coupling device 2 and the non-reciprocal phase shifter 6, while the second mode converter 8 is provided on the second waveguide 5, and provided between the second branching/coupling device 3 and the non-reciprocal phase shifter 6. However, in the polarization-independent optical isolator 1 according to the present invention, the first mode converter 7 can also be provided on the first waveguide 4, and provided between the non-reciprocal phase shifter 6 and the second branching/coupling device 3, while the second mode converter 8 is provided on the second waveguide 5, provided between the first branching/coupling device 2 and the non-reciprocal phase shifter 6.

FIGS. 7A-7D are schematic views showing one example of the process when the light is input in the polarization-independent optical isolator 1. It will be described by separating the input light into the TE-mode and the TM-mode in order to facilitate understanding of this process. However, this does not show that the input light is separated into a polarized wave of the TE-mode and a polarized wave of the TM-mode, and then it is input in the first branching/coupling device 2 or the second branching/coupling device 3. In other words, FIGS. 7A-7D show how the polarized wave of each mode changes when the light includes two polarized waves of the TE-mode and the TM-mode is input in the polarization-independent optical isolator 1. In addition, in the polarization-independent optical isolator 1, the conversion characteristics of the first mode converter 7 and the second mode converter 8 are set to 100%, and further the wavelength of the input light is same as the designed wavelength of the polarization-independent optical isolator 1.

The phase variation is expressed in degree measure.

Therefore, for example, if it is indicated "0°", it expressed that there have no relative phase difference at the position with the same propagation distance of the first waveguide 4 and the second waveguide 5. In other words, the description "TM 0°" indicate that the light wave in the waveguide at that position is the TM-mode, and further the phase difference is "0°" (i.e., there is no phase variation, or there is a phase Variation of 2nπ ("n" is an integer).) in compared the first waveguide 4 with the second waveguide 5.

First of all, with reference to FIG. 7A, it will be described the state which when the TM-mode of the forward propagating light being input in the polarization-independent optical isolator 1 is output.

Figure 7A:
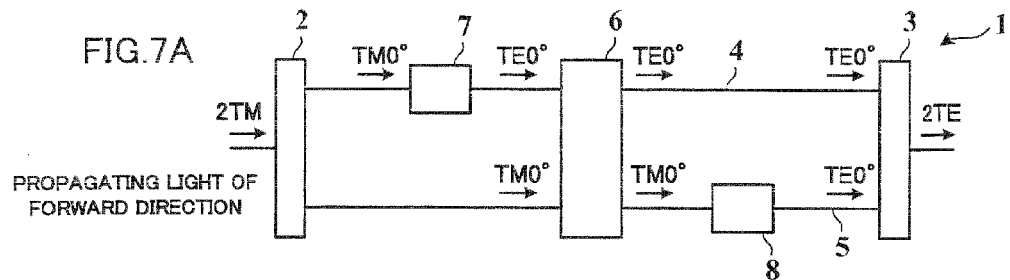
FIGS. 7A-7D are schematic views showing one example of the process when light is input in the polarization-independent optical isolator according to the present invention.

As shown in FIG. 7A, the input light is branched into two light waves with the same phase and the same amplitude by the first branching/coupling device 2. In other words, the amplitude of the light being respectively guided into the first waveguide 4 and the second waveguide 5 becomes "½". Therefore, hereinafter, the TM-mode of the light being input in the first branching/coupling device 2 is indicated as "2TM", and the TM-mode of the light being guided in the first waveguide 4 and the second waveguide 5 is indicated as "TM". It is the same to about the case of the TE-mode.

The TM-mode (TM 0°) being guided in the first waveguide 4 is input in the first mode converter 7. Then, it is converted into the TE-mode (TE 0°) by the first mode converter 7, and thereafter it is input in the non-reciprocal phase shifter 6.

The TM-mode (TM 0°), which is input in the polarization-independent optical isolator 1 and is then branched by the first branching/coupling device 2 and is further guided in the second waveguide 5, unchangingly propagates as the TM-mode, and then it is input in the non-reciprocal phase shifter 6.

The phase difference 0° is given under the condition of the expression (1) in the forward propagating light of the TE-mode (TE 0°) being guided through the first waveguide 4 and then being input in the non-reciprocal phase shifter 6, and the forward propagating light of the TM-mode (TM 0°) being guided through the second waveguide 5 and then being input in the non-reciprocal phase shifter 6. It is output from the non-reciprocal phase shifter 6 as the TE-mode (TE 0°) and the TM-mode (TM 0°), respectively.

Subsequently, the TE-mode (TE 0°) is guided through the first waveguide 4, and then it is input in the second branching/coupling device 3. The TM-mode (TM 0°) is guided through the second waveguide 5, and is input in the second mode converter 8, and then is converted into the TE-mode (TE 0°) by the second mode converter 8, and thereafter is input in the second branching/coupling device 3.

In the second branching/coupling device 3, the TE-mode (TE 0°) being input from the first waveguide 4 and the TE-mode (TE 0°) being input from the second waveguide 5 are coupled together, and thereby it forms the light wave "2TE". Thereafter, the light wave "2TE" is output from the output end of the polarization-independent optical isolator 1.

Figure 7B:
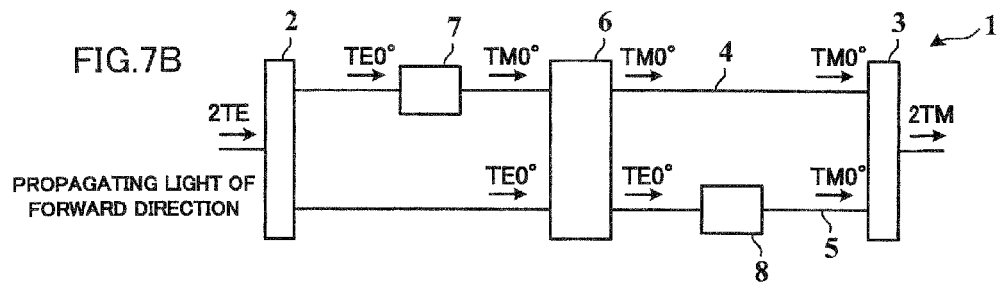

Next, with reference to FIG. 7B, it will be described the state which when the TE-mode of the forward propagating light being input in the polarization-independent optical isolator 1 is output.

The TE-mode (TE 0°), which is input in the polarization-independent optical isolator 1 and is then branched by the first branching/coupling device 2 and is further guided in the first waveguide 4, is input in the first mode converter 7. Then, it is converted into the TM-mode (TM 0°) by the first mode converter 7, and thereafter it is input in the non-reciprocal phase shifter 6.

In addition, the TE-mode (TE 0°), which is input in the polarization-independent optical isolator 1, and is then branched by the first branching/coupling device 2, and is further guided in the second waveguide 5, unchangingly propagates as the TE-mode, and then it is input in the non-reciprocal phase shifter 6.

The phase difference 0° is given under the condition of the expression (1) in the forward propagating light of the TM-mode (TM 0°) being guided through the first waveguide 4 and then being input in the non-reciprocal phase shifter 6, and the forward propagating light of the TE-mode (TE 0°) being guided through the second waveguide 5 and then being input in the non-reciprocal phase shifter 6. Then, it is output from the non-reciprocal phase shifter 6 as the TM-mode (TM 0°) and the TE-mode (TE 0°), respectively.

Subsequently, the TM-mode (TM 0°) is guided through the first waveguide 4 and is then input in the second branching/coupling device 3. The TE-mode (TE 0°) is guided through the second waveguide 5, and is input in the second mode converter 8, and then is converted into the TM-mode (TM 0°) by the second mode converter 8, and thereafter is input in the second branching/coupling device 3.

In the second branching/coupling device 3, the TM-mode (TM 0°) being input from the first waveguide 4 and the TM-mode (TM 0°) being input from the second waveguide 5 are coupled together, and thereby it forms the light wave "2TM". Thereafter, the light wave "2TM" is output from the output end of the polarization-independent optical isolator 1.

Figure 7C:
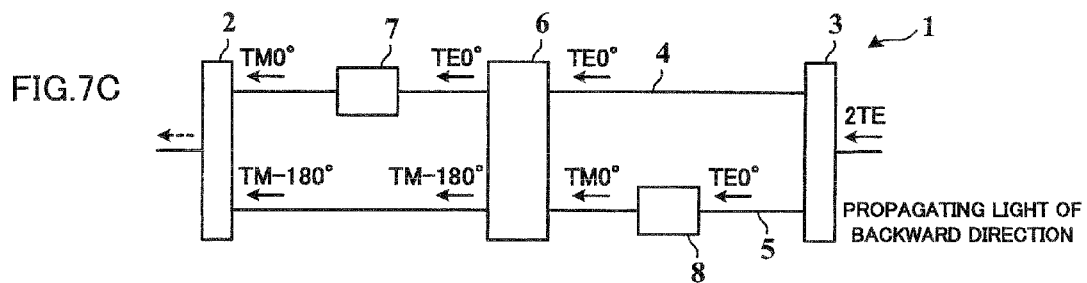

Further, with reference to FIG. 7C, it will be described the state which when the TE-mode of the backward propagating light being input in the polarization-independent optical isolator 1 is output.

The TE-mode (TE 0°), which is input in the polarization-independent optical isolator 1 and is then branched by the second branching/coupling device 3 and is further guided in the first waveguide 4, is unchangingly input in the non-reciprocal phase shifter.

In addition, the TE-mode (TE 0°), which is input in the polarization-independent optical isolator 1, and is then branched by the second branching/coupling device 3, and is further guided in the second waveguide 5, is input in the second mode converter 8. Thereafter, it is converted into the TM-mode (TM 0°) by the second mode converter 8, and then it is input in the non-reciprocal phase shifter 6.

The phase difference)"−π" (−180°) is given under the condition of the expression (2) in the backward propagating light of the TM-mode (TM 0°) being guided through the second waveguide 5 and then being input in the non-reciprocal phase shifter 6 to the backward propagating light of the TE-mode (TE 0°) being guided through the first waveguide 4 and then being input in the non-reciprocal phase shifter 6. In other words, it becomes relatively the phase difference "−180°" when it compares the light being output from the second waveguide 5 at the output end of the non-reciprocal phase shifter 6 with the light being guided through the first waveguide 4 at the position with the same propagation distance, and thereby the light being output to the first waveguide 4 and the second waveguide 5 from the non-reciprocal phase shifter 6 are the TE-mode (TE 0°) and the TM-mode (TM −180°), respectively.

Subsequently, the TE-mode (TE 0°) is guided through the first waveguide 4, and is input in the first mode converter 7, and is then converted into the TM-mode (TM 0°) by the first mode converter 7, and thereafter is input in the first branching/coupling device 2. The TM-mode (TM −180°) is guided through the second waveguide, and is input in the first branching/coupling device 2 unchangingly.

In the first branching/coupling device 2, the TM-mode (TM 0°) being input from the first waveguide 4 and the TM-mode (TM −180°) being input from the second waveguide 5 are coupled together. However, the two light waves being input in the first branching/coupling device 2 are light of the TM-mode in opposite phase which a phase difference is 180°. Therefore, the TM-mode is negated by the symmetry of the two light waves, and thereby the light is not output in the output end of the polarization-independent optical isolator 1 (the light is not output from the input end of the forward propagating light), but is emitted to the outside of the coupling device from the output end (not shown) of the undesired light.

Figure 7D:
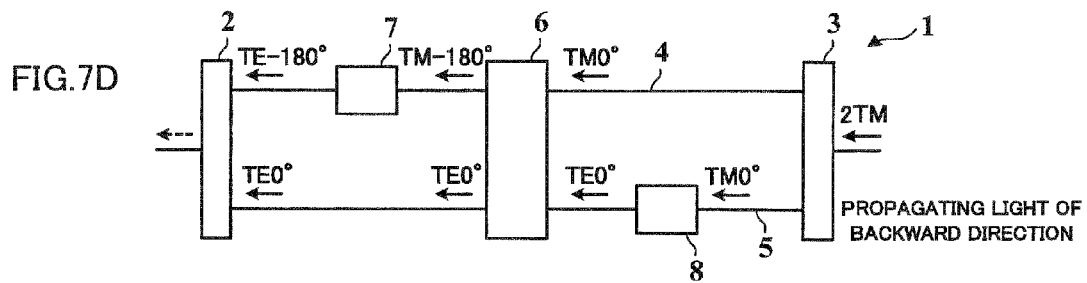

Further, with reference to FIG. 7D, it will be described the state which when the TM-mode of the backward propagating light being input in the polarization-independent optical isolator 1 is output.

The TM-mode (TM 0°), which is input in the polarization-independent optical isolator 1 and is then branched by the second branching/coupling device 3 and is further guided in the first waveguide 4, is unchangingly input in the non-reciprocal phase shifter 6.

In addition, the TM-mode (TM 0°), which is input in the polarization-independent optical isolator 1 and is then branched by the second branching/coupling device 3 and is further guided in the second waveguide 5, is input in the second mode converter 8. Then, it is converted into the TE-mode (TE 0°) by the second mode converter 8, thereafter it is input in the non-reciprocal phase shifter 6.

The phase difference "−π" (−180°) is given under the condition of the expression (2) in the backward propagating light of the TM-mode (TM 0°) being guided through the first waveguide 4 and then being input in the non-reciprocal phase shifter 6 to the backward propagating light of the TE-mode (TE 0°) being guided through the second waveguide 5 and then being input in the non-reciprocal phase shifter 6. In other words, it becomes relatively the phase difference "−180°" when it compares the light being output from the first waveguide 4 at the output end of the non-reciprocal phase shifter 6 with the light being guided through the second waveguide 5 at the position with the same propagation distance, and thereby the light being output in the first waveguide 4 and the second waveguide 5 from the non-reciprocal phase shifter 6 are the TM-mode (TM −180°) and the TE-mode (TE 0°), respectively.

Subsequently, the TM-mode (TM −180°) is guided through the first waveguide 4, and is input in the first mode converter 7, and is then converted into the TE-mode (TE −180°) by the first mode converter 7, and is further input in the first branching/coupling device 2. The TE-mode (TE 0°) is guided through the second waveguide 5, and is input in the first branching/coupling device 2 unchangingly.

In the first branching/coupling device 2, the TE-mode (TE −180°) being input from the first waveguide 4 and the TE-mode (TE 0°) being input from the second waveguide 5 are coupled together. However, the two light waves being input in the first branching/coupling device 2 are light of the TE-mode in opposite phase which a phase difference is 180°. Therefore, the TE-mode is negated by the symmetry of the two light waves, and thereby the light is not output in the output end of the polarization-independent optical isolator 1 (the light is not output from the input end of the forward propagating light), but is emitted to the outside of the coupling device from the output end (not shown) of the undesired light.

As described above, in the polarization-independent optical isolator 1, both the TE-mode and the TM-mode of the forward propagating light being input from the input end (the input end of the first branching/coupling device 2) are output from the output end of the polarization-independent optical isolator 1 (the output end of the second branching/coupling device 3) without suffering an optical loss in principle. In other words, the TM-mode is converted into the TE-mode, and the TE-mode is converted into the TM-mode, thereby it is output from the output end of the polarization-independent optical isolator 1 without suffering the optical loss.

Furthermore, in the polarization-independent optical isolator 1, both the TE-mode and the TM-mode of the backward propagating light being input from the output end (the input end of the second branching/coupling device 3) are not output from the input end of the polarization-independent optical isolator 1 (the output end of the first branching/coupling device 2). That is, the backward propagating light is isolated completely.

In this way, the polarization-independent optical isolator 1 according to the present invention is polarization-independent to the input light of the designed wavelength, and the forward propagating light can be propagated with lossless, meanwhile, it can surely prevent the backward propagating light from the propagation.

Figure 8:
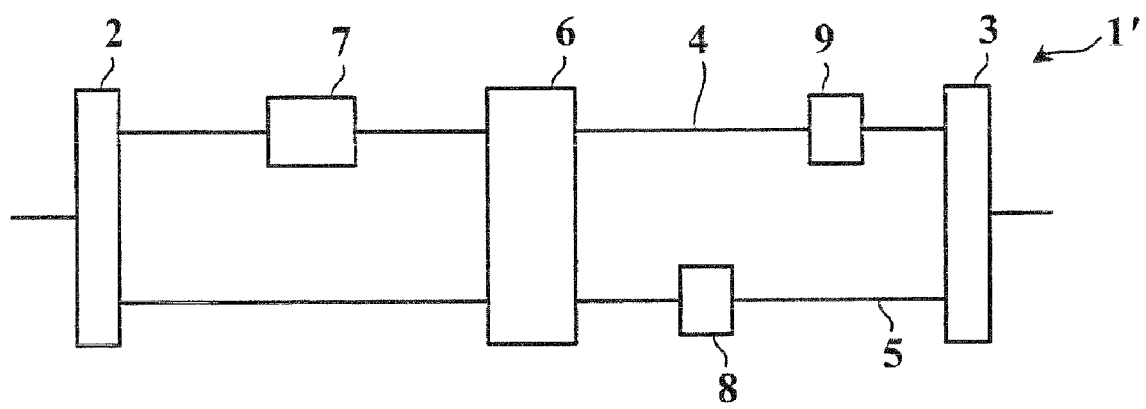
FIG. 8 is a schematic configuration view showing the polarization-independent optical isolator according to an alternative example of the present invention.

FIG. 8 is an example of a schematic configuration view showing the polarization-independent optical isolator 1' according to an alternative example of the present invention. The polarization-independent optical isolator 1' according to this embodiment is substantially the same as the above-described polarization-independent optical isolator 1 except for providing a reciprocal phase shifter 9. Therefore, in what follows, the same symbols are given to the same components, and the detailed description thereof will be omitted.

As shown in FIG. 8, the polarization-independent optical isolator 1' is constituted by comprising at least a first branching/coupling device 2, a second branching/coupling device 3, a first waveguide 4, a second waveguide 5, a non-reciprocal phase shifter 6, a first mode converter 7, a second mode converter 8 and a reciprocal phase shifter 9.

In this embodiment, the reciprocal phase shifter 9 is provided on the first waveguide 4 between the non-reciprocal phase shifter 6 and the second branching/coupling device 3. However, the reciprocal phase shifter 9 may be provided at any position on either the first waveguide 4 or the second waveguide 5.

The reciprocal phase shifter 9 is achieved by setting so that the optical length of one of the waveguides differs from the optical length of the other waveguide. In this instance, the optical lengths of the waveguides can be adjusted by changing the constitutive parameters of the waveguides such as length, width, and the refractive indexes or the like.

Further, in the present embodiment, the reciprocal phase shifter 9 gives a prescribed phase difference to the passing forward propagating light and the passing backward propagating light. More specifically, the phase difference given by the reciprocal phase shifter 9 is "$(2l+1)\pi$" ("l" is an integer). In the present embodiment, it gives a phase difference "π" for convenience.

In addition, the non-reciprocal phase shifter 6 changes the magnetization direction of the non-reciprocal phase shifter 6 shown in FIG. 3 from the relationship with the reciprocal phase shifter 9. More specifically, in a case where the phase variation of the TE-mode to the forward propagating light in the designed wavelength is "$\phi_{TE}^f$", and the phase variation of the TM-mode to the forward propagating light in the designed wavelength is "$\phi_{TM}^f$", and the phase variation of the TE-mode to the backward propagating light in the designed wavelength is "$\phi_{TE}^b$", and the phase variation of the TM-mode to the backward propagating light in the designed wavelength is "$\phi_{TM}^b$", the phase difference given by the non-reciprocal phase shifter 6 is expressed as follows:

$$\phi_{TE}^f - \phi_{TM}^f = (2m+1)\pi \text{ ("m" is an integer)} \quad (3)$$

$$\phi_{TE}^b - \phi_{TM}^b = 2n\pi \text{ ("n" is an integer)}$$

In this case, "n=m" may also be allowed.

In the present embodiment, as one example, a phase difference "$-\pi$" is given between the TE-mode of the forward propagating light and the TM-mode of the forward propagating light, and a phase difference 0° is given between the TE-mode of the backward propagating light and the TM-mode of the backward propagating light.

FIGS. 9A-9D are schematic views showing one example of the process when the light is input in the polarization-independent optical isolator 1'. In the present embodiment also, it will be described by separating the input light into the TE-mode and the TM-mode in order to facilitate understanding of the process. However, this does not show that the input light is separated into the polarized wave of the TE-mode and the polarized wave of the TM-mode, and then it is input in the first branching/coupling device 2 or the second branching/coupling device 3.

In addition, in FIGS. 9A-9D, it should be noted that the light wave propagating from the left-hand side to the right-hand side is the backward propagating light, and the light wave propagating from the right-hand side to the left-hand side is the forward propagating light.

First of all, with reference to FIG. 9A, it will be described the state which when the TM-mode of the backward propagating light being input in the polarization-independent optical isolator 1' is output.

The TM-mode (TM 0°), which is input in the polarization-independent optical isolator 1' and is then branched by the first branching/coupling device 2 and is further guided in the first waveguide 4, is input in the first mode converter 7. Then, it is converted into the TE-mode (TE 0°) by the first mode converter 7, and thereafter it is input in the non-reciprocal phase shifter 6.

The TM-mode (TM 0°), which is input in the polarization-independent optical isolator 1' and is then branched by the first branching/coupling device 2 and is further guided in the second waveguide 5, is input in the non-reciprocal phase shifter 6, unchangingly.

The phase difference 0° is given under the condition of the expression (4) in the backward propagating light of the TE-mode (TE 0°) being guided through the first waveguide 4 and then being input in the non-reciprocal phase shifter 6, and the backward propagating light of the TM-mode (TM 0°) being guided through the second waveguide 5 and then being input in the non-reciprocal phase shifter 6. It is output from the non-reciprocal phase shifter 6 as the TE-mode (TE 0°) and the TM-mode (TM 0°), respectively.

Subsequently, the TE-mode is guided through the first waveguide 4 and is then input in the reciprocal phase shifter 9. Then, a phase difference 180° ($\pi$) is given by the reciprocal phase shifter 9. In other words, it becomes relatively the phase difference 180° when it compares with the light being guided through the second waveguide 5 at the position with the same propagation distance. Therefore, the TE-mode (TE 180°) is output from the reciprocal phase shifter 9, and is then input in the second branching/coupling device 3.

Furthermore, the TM-mode (TM 0°) being output from the non-reciprocal phase shifter 6 is guided through the second waveguide 5, and is input in the second mode converter 8, and is then converted into the TE-mode (TE 0°) by the second mode converter 8, and is further input in the second branching/coupling device 3.

In the second branching/coupling device 3, the TE-mode (TE 180°) being input from the first waveguide 4 and the TE-mode (TE 0°) being input from the second waveguide 5 are coupled together. However, the two light waves being input into the second branching/coupling device 3 are the TE-modes in opposite phase which a phase difference is 180°. Therefore, the TE-mode of the backward propagating light is negated by the symmetry of the two light waves, and thereby the light is not output in the output end of the polarization-independent optical isolator 1' (the light is not output from the input end of the forward propagating light), but is emitted to the outside of the coupling device from the output end (not shown) of the undesired light.

Next, with reference to FIG. 9B, it will be described the state which when the TE-mode of the backward propagating light being input in the polarization-independent optical isolator 1' is output.

The TE-mode (Ti)0°, which is input in the polarization-independent optical isolator 1' and is then branched by the first branching/coupling device 2 and is further guided in the first waveguide 4, is input in the first mode converter 7. It is converted into the TM-mode (TM 0°) by the first mode converter 7, and is then input in the non-reciprocal phase shifter 6.

In addition, the TE-mode (TE 0°), which is input in the polarization-independent optical isolator 1' and is then branched by the first branching/coupling device 2 and is further guided in the second waveguide 5, is input in the non-reciprocal phase shifter 6, unchangingly.

The phase difference 0° is given under the condition of the expression (4) in the backward propagating light of the TM-mode (TM 0°) being guided through the first waveguide 4 and then being input in the non-reciprocal phase shifter 6, and the backward propagating light of the TE-mode (TE 0°) being guided through the second waveguide 5 and then being input in the non-reciprocal phase shifter 6. Then, it is output from the non-reciprocal phase shifter 6 as the TM-mode (TM 0°) and the TE-mode (TE 0°), respectively.

Subsequently, the TM-mode (TM 0°) is guided through the first waveguide 4, and is then input in the reciprocal phase shifter 9. A phase difference 180° ($\pi$) is given by the reciprocal phase shifter 9. In other words, it becomes relatively the phase difference 180° when it compares with the light being guided through the second waveguide 5 at the position with the same propagation distance. Therefore, the TM-mode (TM 180°) is output from the reciprocal phase shifter 9, and is then input in the second branching/coupling device 3.

Furthermore, the TE-mode (TE 0°) being output from the non-reciprocal phase shifter 6 is guided through the second waveguide 5, and is input in the second mode converter 8. Then, it is converted into the TM-mode (TM 0°) by the second mode converter 8, thereafter it is input in the second branching/coupling device 3.

In the second branching/coupling device 3, the TM-mode (TM 180°) being input from the first waveguide 4 and the TM-mode (TM 0°) being input from the second waveguide 5 are coupled together. However, the two light waves being input in the second branching/coupling device 3 are the TM-modes in opposite phase which a phase difference is 180°.

Therefore, by the symmetry of the two light waves, the TM-mode of the backward propagating light is not output in the output end of the polarization-independent optical isolator 1' (it is not output from the input end of the forward propagating light), but is emitted to the outside of the coupling device from the output ends (not shown) of the undesired light.

Next, with reference to FIG. 9C, it will be described the state which when the light wave of the TE-mode of the forward propagating light being input in the polarization-independent optical isolator 1' is output.

The TE-mode (TE 0°), which is input in the polarization-independent optical isolator 1' and is then branched by the second branching/coupling device 3 and is further guided in the first waveguide 4, is input in the reciprocal phase shifter 9. A phase difference 180° ($\pi$) is given by the reciprocal phase shifter 9. In other words, it becomes relatively the phase difference 180° when it compares with the light being guided through the second waveguide 5 at the position with the same propagation distance. Therefore, the TE-mode (TE 180°) is output from the reciprocal phase shifter 9, and is then input in the non-reciprocal phase shifter 6.

Furthermore, the TE-mode (TE 0°), which is input in the polarization-independent optical isolator 1' and is then branched by the second branching/coupling device 3 and is further guided in the second waveguide 5, is input in the second mode converter 8. It is converted into the TM-mode (TM 0°) by the second mode converter 8, and is then input in the non-reciprocal phase shifter 6.

The phase difference "$-\pi$" ($-180°$) is given under the condition of the expression (3) in the forward propagating light of the TM-mode (TM 0°) being guided through the second waveguide 5 and then being input in the non-reciprocal phase shifter 6 to the forward propagating light of the TE-mode (TE 180°) being guided through the first waveguide 4 and then being input in the non-reciprocal phase shifter 6. Therefore, the light being output to the first waveguide 4 and the second waveguide 5 from the non-reciprocal phase shifter 6 are the TE-mode (TE 180°) and the TM-mode (TM −180°), respectively.

Subsequently, the TE-mode (TE 180°) is guided through the first waveguide 4, and is input in the first mode converter 7, and is then converted into the TM-mode (TM 180°) by the first mode converter 7, and is further input in the first branching/coupling device 2.

In addition, the TM-mode (TM −180°) is guided through the second waveguide, and is then input in the first branching/coupling device 2, unchangingly.

In the first branching/coupling device 2, the TM-mode (TM 180°) being input from the first waveguide 4 and the TM-mode (TM −180°) being input from the second waveguide 5 are coupled together. In this case, the two light waves being input in the first branching/coupling device 2 are the TM-modes in the same phase which a phase difference is 360° ($2\pi$). Therefore, the two light waves become a light wave "2TM" by coupling the two light waves in the first branching/coupling device 2, whereby the light wave "2TM" is output from the output end of the polarization-independent optical isolator 1'.

Next, with reference to FIG. 9D, it will be described the state which when the light wave of the TM-mode of the forward propagating light being input in the polarization-independent optical isolator 1' is output.

The TM-mode (TM 0°), which is input in the polarization-independent optical isolator 1' and is then branched by the second branching/coupling device 3 and is further guided in the first waveguide 4, is input in the reciprocal phase shifter 9. A phase difference 180° ($\pi$) is given by the reciprocal phase shifter 9. In other words, it becomes relatively the phase difference 180° when it compares with the light being guided through the second waveguide 5 at the position with the same propagation distance. Therefore, the TM-mode (TM 180°) is output from the reciprocal phase shifter 9, and is then input in the non-reciprocal phase shifter 6.

Furthermore, the TM-mode (TM 0°), which is input in the polarization-independent optical isolator 1' and is then branched by the second branching/coupling device 3 and is further guided in the second waveguide 5, is input in the second mode converter 8. It is converted into the TE-mode (TE 0°) by the second mode converter 8, is then input in the non-reciprocal phase shifter 6.

The phase difference "−180°" ($-\pi$) is given under the condition of the expression (3) in the forward propagating light of the TM-mode (TM 180°) being guided through the first waveguide 4 and then being input in the non-reciprocal phase shifter 6 to the forward propagating light of the TE-mode (TE 0°) being guided through the second waveguide 5 and then being input in the non-reciprocal phase shifter 6. Therefore, the light being output to the first waveguide 4 and the second waveguide 5 from the non-reciprocal phase shifter 6 are the TM-mode (TM 0°) and the TE-mode (TE 0°), respectively.

Subsequently, the TM-mode (TM 0°) is guided through the first waveguide 4, and is input in the first mode converter 7, and is then converted into the TE-mode (TE 0°) by the first mode converter 7, and is further input in the first branching/coupling device 2. The TE-mode (TE 0°) is guided through the second waveguide 5, and is then input in the first branching/coupling device 2, unchangingly.

The TE-mode (TE 0°) being input from the first waveguide 4 and the TE-mode (TE 0°) being input from the second waveguide 5 become a light wave "2TE" by coupling it together in the first branching/coupling device 2. Thereafter, the light wave "2TE" is output from the output end of the polarization-independent optical isolator 1'.

As described above, in the polarization-independent optical isolator 1' also, both the TE-mode and the TM-mode of the forward propagating light being input from the input end (the input end of the second branching/coupling device 3) are output from the output end of the polarization-independent optical isolator 1' (the output end of the first branching/coupling device 2) without suffering an optical loss in principle. In other words, the TM-mode is converted into the TE-mode, and the TE-mode is converted into the TM-mode, thereby it is output from the output end of the polarization-independent optical isolator 1' without suffering the optical loss.

Furthermore, in the polarization-independent optical isolator 1', both the TE-mode and the TM-mode of the backward propagating light being input from the output end (the input end of the first branching/coupling device 2) are not output from the input end of the polarization-independent optical isolator 1' (the output end of the second branching/coupling device 3). That is, the backward propagating light is isolated completely.

In this way, the polarization-independent optical isolator 1' according to the present invention is polarization-independent to the input light of the designed wavelength, and the forward propagating light can be propagated with lossless, meanwhile, it can surely prevent the backward propagating light from the propagation.

FIGS. 10A-10D are schematic views showing one example of the process when the light is input in the polarization-independent optical isolator 1" which the characteristics of the first mode converter and the second mode converter are incomplete. More specifically, FIGS. 10A-10D show the process in a case where the first mode converter 7 and the second mode converter 8 of the polarization-independent optical isolator 1" convert the modes of the light wave at only a conversion efficiency η (η<1). Since the polarization-independent optical isolator 1" according to this embodiment is substantially the same as the above-described polarization-independent optical isolator 1' except for the characteristics of the first mode converter 2 and the second mode converter 3. Therefore, in what follows, the same symbols are given to the same components, and the detailed description thereof will be omitted. In addition, in FIGS. 10A-10D, it should be noted that the light propagating from the left-hand side to the right-hand side is the backward propagating light, and the light propagating from the right-hand side to the left-hand side is the forward propagating light.

Figure 10A:
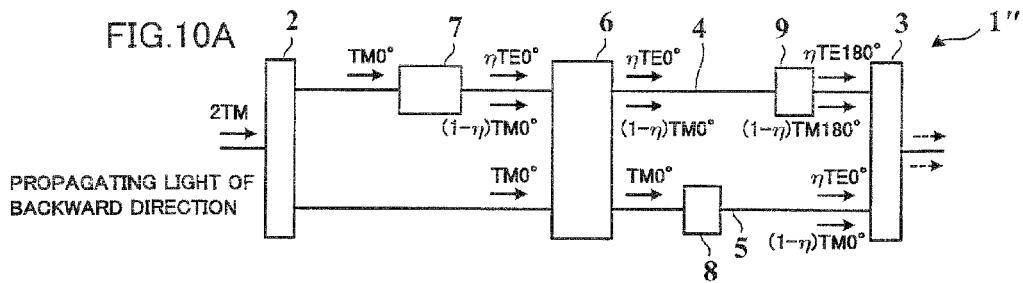
FIGS. 10A-10D are schematic views showing one example of the process when light is input in the polarization-independent optical isolator according to another alternative example of the present invention.

First of all, with reference to FIG. 10A, it will be described the state which when the TM-mode of the backward propagating light being input in the polarization-independent optical isolator 1" is output.

The TM-mode (TM 0°), which is input in the polarization-independent optical isolator 1" and is then branched by the first branching/coupling device 2 and is further guided in the first waveguide 4, is input in the first mode converter 7. Only the rate η of the TM-mode (TM 0°) is converted into the TE-mode (ηTE)0° by the first mode converter 7, and then is output. Meanwhile the remaining rate (1−η) of the TM-mode is output while maintaining the TM-mode ((1−η)TM 0°) Thereafter, both the TE-mode (ηTE 0°) and the TM-mode ((1−η)TM 0°) are input in the non-reciprocal phase shifter 6.

In addition, the TM-mode (TM 0°), which is input in the polarization-independent optical isolator 1" and is then branched by the first branching/coupling device 2 and is further guided in the second waveguide 5, is input in the non-reciprocal phase shifter 6, unchangingly.

The phase difference 0° is given under the condition of the expression (4) in the backward propagating light of the TE-mode (ηTE)0° and the backward propagating light of the TM-mode ((1−η)TM 0°) being guided through the first waveguide 4 and then being input in the non-reciprocal phase shifter 6, and the backward propagating light of the TM-mode (TM 0°) being guided through the second waveguide 5 and then being input in the non-reciprocal phase shifter 6. Therefore, it is output from the non-reciprocal phase shifter 6 as the TE-mode (gTE)0°, the TM-mode ((1−η)TM 0°) and the TM-mode (TM 0°), respectively.

Subsequently, the TE-mode (ηTE 0°) and the TM-mode ((1−η)TM 0°) are guided through the first waveguide 4, and are then input in the reciprocal phase shifter 9. A phase difference 180° (π) is given by the reciprocal phase shifter 9. In other words, it becomes relatively the phase difference 180° when it compares with the light being guided through the second waveguide 5 at the position with the same propagation distance. Therefore, the TE-mode (ηTE 180°) and the TM-mode ((1−η)TM 180°) are output from the reciprocal phase shifter 9, and are then guided through the first waveguide 4, and both are further input in the second branching/coupling device 3.

Further, the TM-mode (TM 0°) being output from the non-reciprocal phase shifter 6 is guided through the second waveguide 5, and is then input in the second mode converter 8. Only the rate η of the TM-mode (TM 0°) is converted into the TE-mode (ηTE 0°) by the second mode converter 8, and then is output. Meanwhile the remaining rate (1−η) of the TM-mode is output while maintaining the TM-mode ((1−η) TM 0°). Thereafter, both the TE-mode (ηTE 0°) and the TM-mode ((1−η)TM 0°) are input in the second branching/coupling device 3.

In the second branching/coupling device 3, the TE-mode (ηTE 180°) and the TM-mode ((1−η)TM 180°) being input from the first waveguide 4, and the TE-mode (ηTE 0°) and the TM-mode ((1−η)TM 0°) being input from the second waveguide 5 are coupled together.

However, the two light waves of the TE-mode being input in the second branching/coupling device 3 are light having the same amplitude and an opposite phase to each other with a phase difference 180°. Therefore, the TE-mode is negated by the symmetry of the two light waves, and thereby the light is not output in the output end of the polarization-independent optical isolator 1" (the light is not output from the input end of the forward propagating light), but is emitted to the outside of the coupling device from the output end (not shown) of the undesired light.

Furthermore, the two light waves of the TM-mode being input in the second branching/coupling device 3 are also light of the TM-mode having the same amplitude and an opposite phase to each other with a phase difference 180°. Therefore, the TM-mode is negated by the symmetry of the two light waves, and thereby the light is not output in the output end of the polarization-independent optical isolator 1", but is emitted to the outside of the coupling device from the output end (not shown) of the undesired light.

Figure 10B:
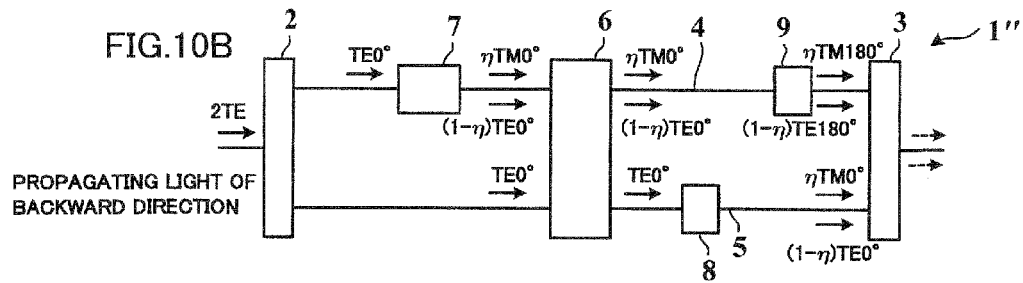

Next, with reference to FIG. 10B, it will be described the state which when the TE-mode of the backward propagating light being input in the polarization-independent optical isolator 1" is output.

The TE-mode (TE 0°), which is input in the polarization-independent optical isolator 1" and is then branched by the first branching/coupling device 2 and is further guided in the first waveguide 4, is input in the first mode converter 7. Only the rate η of the TE-mode (TE 0°) is converted into the TM-mode (ηTM 0°) by the first mode converter 7, and then is output. Meanwhile the remaining rate (1−η) of the TE-mode is output while maintaining the TE-mode ((1−η)TE 0°). Thereafter, both the TM-mode (ηTM 0°) and the TE-mode ((1−η)TE 0°) are input in the non-reciprocal phase shifter 6.

In addition, the TE-mode (TE 0°), which is input in the polarization-independent optical isolator 1" and is then branched by the first branching/coupling device 2 and is further guided in the second waveguide 5, is input in the non-reciprocal phase shifter 6, unchangingly.

The phase difference 0° is given under the condition of the expression (4) in the backward propagating light of the TM-mode (ηTM 0°) and the backward propagating light of the TE-mode ((1−η)TE 0°) being guided through the first waveguide 4 and then being input in the non-reciprocal phase shifter 6, and the backward propagating light of the TE-mode (TE 0°) being guided through the second waveguide 5 and then being input in the non-reciprocal phase shifter 6. Therefore, it is output from the non-reciprocal phase shifter 6 as the TM-mode (ηTM 0°), the TE-mode ((1−η)TE 0°) and the TE-mode (TE 0°), respectively.

Subsequently, the TM-mode (ηTM 0°) and the TE-mode ((1−η)TE 0°) are guided through the first waveguide 4, and are then input in the reciprocal phase shifter 9. A phase difference 180° (π) is given by the reciprocal phase shifter 9. In other words, it becomes relatively the phase difference 180° when it compares with the light being guided through the second waveguide 5 at the position with the same propagation distance. Therefore, the TM-mode (ηTM 180°) and the TE-mode ((1−η)TE 180°) are output from the reciprocal phase shifter 9, and are then guided through the first waveguide 4, and both are further input in the second branching/coupling device 3.

Further, the TE-mode (TE 0°) being output from the non-reciprocal phase shifter 6 is guided through the second waveguide 5, and is then input in the second mode converter 8. Only the rate η of the TE-mode (TE 0°) is converted into the TM-mode (ηTM 0°) by the second mode converter 8, and then is output. Meanwhile the remaining rate (1−η) of the TE-mode is output while maintaining the TE-mode ((1−η)TE 0°). Thereafter, both the TM-mode (ηTM 0°) and the TE-mode ((1−η)TE 0°) are input in the second branching/coupling device 3.

In the second branching/coupling device 3, the TM-mode (ηTM 180°) and the TE-mode ((1−η)TE 180°) being input from the first waveguide 4, and the TM-mode (ηTM 0°) and the TE-mode ((1−η) TE 0°) being input from the second waveguide 5 are coupled together.

However, the two light waves of the TM-mode being input in the second branching/coupling device 3 are light having the same amplitude and an opposite phase to each other with a phase difference 180°. Therefore, the TM-mode is negated by the symmetry of the two light waves, and thereby the light is not output in the output end of the polarization-independent optical isolator 1" (the light is not output from the input end of the forward propagating light), but is emitted to the outside of the coupling device from the output end (not shown) of the undesired light.

Furthermore, the two light waves of the TE-mode being input in the second branching/coupling device 3 are also light waves of the TE-mode having the same amplitude and an opposite phase to each other with a phase difference 180°. Therefore, the TE-mode is negated by the symmetry of the two light waves, and thereby the light is not output in the output end of the polarization-independent optical isolator 1", but is emitted to the outside of the coupling device from the output ends (not shown) of the undesired light.

Figure 10C:
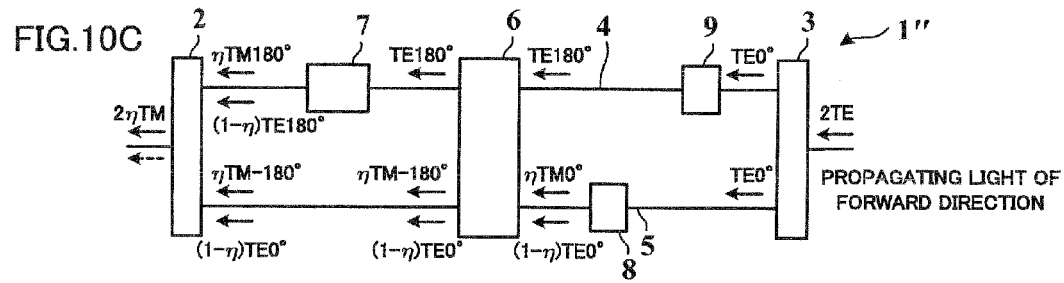

Next, with reference to FIG. 10C, it will be described the state which when the TE-mode of the forward propagating light being input in the polarization-independent optical isolator 1" is output.

The TE-mode (TE 0°), which is input in the polarization-independent optical isolator 1" and is then branched by the second branching/coupling device 3 and is further guided in the first waveguide 4, is input in the reciprocal phase shifter 9. A phase difference 180° (π) is given by the reciprocal phase shifter 9. In other words, it becomes relatively the phase difference 180° when it compares with the light being guided through the second waveguide 5 at the position with the same propagation distance. Therefore, the TE-mode (TE 180°) is output from the reciprocal phase shifter 9, and are then guided in the non-reciprocal phase shifter 6.

Furthermore, the TE-mode (TE 0°), which is input in the polarization-independent optical isolator 1" and is then branched by the second branching/coupling device 3 and is further guided in the second waveguide 5, is input in the second mode converter 8. Only the rate η of the TE-mode (TE 0°) is converted into the TM-mode (ηTM 0°) by the second mode converter 8, and is then output. Meanwhile the remaining rate (1−η) of the TE-mode is output while maintaining the TE-mode ((1−η)TE 0°). Thereafter, both the TM-mode (ηTM 0°) and the TE-mode ((1−η)TE 0°) are input in the non-reciprocal phase shifter 6.

In the non-reciprocal phase shifter 6, the phase difference "−180°" (−π) is given under the condition of the expression (3) in the backward propagating light of the TM-mode to the forward propagating light of the TE-mode. In other words, since a phase difference "−180°" (−π) is given in the forward propagating light of the TM-mode (TM 0°) being guided through the second waveguide 5 and then being input in the non-reciprocal phase shifter 6 to the forward propagating light of the TE-mode (TE 180°) being guided through the first waveguide 4 and then being input in the non-reciprocal phase shifter 6, and thereby the TM-mode (ηTM −180°) is output to the second waveguide 5 from the non-reciprocal phase shifter 6. Furthermore, a phase difference 0° is given in the forward propagating light of the TE-mode ((1−η)TE 0°) being guided through the second waveguide 5 and then being input in the non-reciprocal phase shifter 6 to the forward propagating light of the TE-mode (TE 180°) in the first waveguide 4. Therefore, the TE-mode ((1−η)TE 0°) is output from the non-reciprocal phase shifter 6.

Subsequently, the TE-mode (TE 180°) is guided through the first waveguide 4, and is then input in the first mode converter 7. Similarly, only the rate η of the TE-mode (TE 180°) is converted into the TM-mode (ηTM 180°) by the first mode converter 7, and is then output. Meanwhile the remaining rate (1−η) of the TE-mode is output while maintaining the TE-mode ((1−η)TE 180°). Thereafter, both the TM-mode (ηTM 180°) and the TE-mode ((1−η)TE 180°) are input in the first branching/coupling device 2.

In addition, the TM-mode (ηTM −180°) and the TE-mode ((1−η)TE 0°) being output from the non-reciprocal phase shifter 6 are guided in the second waveguide 5, and are then input in the first branching/coupling device 2, unchangingly.

In the first branching/coupling device 3, the TM-mode (ηTM 180°) and the TE-mode ((1−η)TE 180°) being input from the first waveguide 4, and the TM-mode (ηTM −180°) and the TE-mode ((1−η)TE 0°) being input from the second waveguide 5 are coupled together.

The two light waves of the TM-mode being input in the first branching/coupling device 2 are the light having the same amplitude and the same phase with a phase difference 360° (that is, 0°). Therefore, the two light waves becomes a light wave "2ηTM" by coupling it together, and thereafter the light wave "2ηTM" is output from the output end of the polarization-independent optical isolator 1".

Furthermore, the two light waves of the TE-mode being input in the first branching/coupling device 2 are the light having the same amplitude and an opposite phase to each other with a phase difference 180°. Therefore, the TE-mode is negated by the symmetry of the two light waves, and thereby the light is not output in the output end of the polarization-independent optical isolator 1" (it is not output from the input end of the forward propagating light), but is emitted to the outside of the coupling device from the output end (not shown) of the undesired light.

Figure 10D:
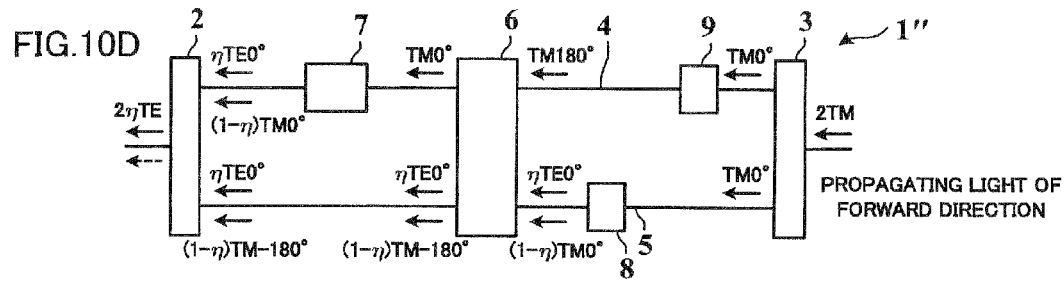

Next, with reference to FIG. 10D, it will be described the state which when the TM-mode of the forward propagating light being input in the polarization-independent optical isolator 1" is output.

The TM-mode (TM 0°), which is input in the polarization-independent optical isolator 1" and is then branched by the second branching/coupling device 3 and is further guided in the first waveguide 4, is input in the reciprocal phase shifter 9. A phase difference 180° (π) is given by the reciprocal phase shifter 9. In other words, it becomes relatively the phase difference 180° when it compares with the light being guided through the second waveguide 5 at the position with the same propagation distance. Therefore, the TM-mode (TM 180°) is output from the reciprocal phase shifter 9, and are then guided in the non-reciprocal phase shifter 6.

Furthermore, the TM-mode (TM 0°), which is input in the polarization-independent optical isolator 1" and is then branched by the second branching/coupling device 3 and is further guided in the second waveguide 5, is input in the second mode converter. Only the rate η of the TM-mode (TM 0°) is converted into the TE-mode (ηTE 0°) by the second mode converter 8, and is then output. Meanwhile the remaining rate (1−η) of the TM-mode is output while maintaining the TM-mode ((1−η)TM 0°. Thereafter, both the TE-mode (ηTE 0°) and the TM-mode ((1−η)TM 0°) are input in the non-reciprocal phase shifter 6.

In the non-reciprocal phase shifter 6, a phase difference of "−180°" (−π) is given under the condition of the expression (3) in the forward propagating light of the TM-mode to the forward propagating light of the TE-mode. In other words, since a phase difference "−180°" (−π) is given in the forward propagating light of the TM-mode (TM 180°) being guided through the first waveguide 4 and then being input in the non-reciprocal phase shifter 6 to the forward propagating light of the TE-mode (ηTE 0°) being guided through the second waveguide 5 and then being input the non-reciprocal phase shifter 6, and thereby the TM-mode (TM 0°) is output from the non-reciprocal phase shifter 6. Further, since a phase difference "−180°" (−π) is also given in the TM-mode ((1−η)TM 0°) being input in the non-reciprocal phase shifter 6 from the second waveguide 5, and thereby the TM-mode ((1−η)TM −180°) is output from the non-reciprocal phase shifter 6. Furthermore, the TE-mode (ηTE 0°) being input in the non-reciprocal phase shifter 6 from the second waveguide 5 is output from the non-reciprocal phase shifter 6 as the TE-mode (ηTE 0°).

Subsequently, the TM-mode (TM 0°) being output from the non-reciprocal phase shifter 6 is guided through the first waveguide 4, and is then input in the first mode converter 7. Only the rate η of the TM-mode (TM 0°) is converted into the TE-mode (ηTE 0°) by the first mode converter 7, and is then output. Meanwhile the remaining rate (1−η) of the TM-mode is output while maintaining the TM-mode ((1−η)TM 0°). Then, both the TE-mode (ηTE 0°) and the TM-mode ((1−η)TM 0°) are input in the first branching/coupling device 2.

In addition, the TE-mode (ηTE 0°) and the TM-mode ((1−η)TM −180°) being output from the non-reciprocal phase shifter 6 are guided through the second waveguide 5, and are then input in the first branching/coupling device 2.

In the first branching/coupling device 2, the TE-mode (TE 0°) and the TM-mode ((1−η)TM 0°) being input from the first waveguide 4, and the TE-mode (ηTE 0°) and the TM-mode ((1−η)TM −180°) being input from the second waveguide 5 are coupled together.

The two light waves of the TE-mode being input in the first branching/coupling device 2 are the light having the same amplitude and the same phase with a phase difference 0°. Therefore, the two light waves become a light wave "2ηTE" by coupling it together. Then, the light wave "2ηTE" is output from the output end of the polarization-independent optical isolator 1″.

Furthermore, the two light waves of the TM-mode being input in the first branching/coupling device 2 are the light having the same amplitude and an opposite phase to each other with a phase difference 180°. Therefore, the TM-mode is negated by the symmetry of the two light, waves, and thereby the light is not output in the output end of the polarization-independent optical isolator 1″ (it is not output from the input end of the forward propagating light), but is emitted to the outside of the coupling device from the output end (not shown) of the undesired light.

As described above, in the polarization-independent optical isolator 1″ also, both the TE-mode and the TM-mode of the forward propagating light being input from the input end (the input end of the second branching/coupling device 3) is output from the output end of the polarization-independent optical isolator 1″ (the output end of the first branching/coupling device 2). In other words, the TM-mode is converted into the ηTE-mode, and the TE-mode is converted into the ηTM-mode. Then, both the ηTE-mode and the ηTM-mode is output from the output end of the polarization-independent optical isolator 1″. In this case, a loss which only quantity equivalent to the incompleteness (1−η) of the first mode converter 7 and the second mode converter 8 will occur. However, in a case where the specifications form of the isolator is considered, it is important to prevent the backward propagation of the light. Therefore, this optical loss is not a serious defect as long as the foregoing performance can be achieved.

In addition, in the polarization-independent optical isolator 1″, both the TE-mode and the TM-mode of the backward propagating light being input from the output end (the input end of the first branching/coupling device 2) is not output from the input end (the output end of the second branching/coupling device 3). In other words, the backward propagating light is isolated completely.

In this manner, the polarization-independent optical isolator 1″ according to the present invention is also polarization-independent to the backward propagating light of a designed wavelength, and it can surely prevent the backward propagating light from the propagation.

The invention claimed is:

1. A polarization-independent optical isolator comprising:
    a first branching/coupling device and a second branching/coupling device;
    a first waveguide and a second waveguide which are respectively connected to the first branching/coupling device and the second branching/coupling device;
    a non-reciprocal phase shifter which is provided so as to straddle on the first waveguide and the second waveguide, and which gives a prescribed phase difference to a forward propagating light and a backward propagating light respectively propagating in the first and second waveguides;
    a first mode converter provided on the first waveguide; and
    a second mode converter provided on the second waveguide;
    wherein the second mode converter is provided between the non-reciprocal phase shifter and the second branching/coupling device in a case where the first mode converter is provided between the first branching/coupling device and the non-reciprocal phase shifter, and the second mode converter is provided between the non-reciprocal phase shifter and the first branching/coupling device in a case where the first mode converter is provided between the second branching/coupling device and the non-reciprocal phase shifter.

2. A polarization-independent optical isolator according to claim 1, wherein the prescribed phase difference of the non-reciprocal phase shifter is expressed as follows:

$$\phi_{TE}^{f} - \phi_{TM}^{f} = 2m\pi \text{ ("m" is an integer) and}$$

$$\phi_{TE}^{b} - \phi_{TM}^{b} = (2n+1)\pi \text{ ("n" is an integer),}$$

in a case where a phase variation of a TE-mode to the forward propagating light is "$\phi_{TE}^{f}$", and a phase variation of a TM-mode to the forward propagating light is "$\phi_{TM}^{f}$", and in a case where a phase variation of a TE-mode to the backward propagating light is "$\phi_{TE}^{b}$", and a phase variation of a TM-mode to the backward propagating light is "$\phi_{TM}^{b}$".

3. A polarization-independent optical isolator according to claim 1, wherein a reciprocal phase shifter is provided to either the first waveguide or the second waveguide, and a prescribed phase is given difference to the propagating light passing through the reciprocal phase shifter.

4. A polarization-independent optical isolator according to claim 3, wherein the prescribed phase difference of the reciprocal phase shifter is $(2l+1)\pi$ ("l" is an integer).

5. A polarization-independent optical isolator according to claim 3, wherein the certain phase difference of the non-reciprocal phase shifter is expressed as follows:

$\phi_{TE} - \phi^f_{TM} = (2m+1)\pi$ ("m" is an integer) and $\phi_{TE} - \phi^b_{TM} = 2n\pi$ ("n" is an integer), in a case where a phase variation of the TE-mode to the forward propagating light is "$\phi_{TE}$", and a phase variation of the TM-mode to the forward propagating light is "$\phi^f_{TM}$", and in a case where a phase variation of the TE-mode to the backward propagating light is "$\phi_{TE}$", and a phase variation of the TM-mode to the backward propagating light is "$\phi^b_{TM}$".

6. A polarization-independent optical isolator according to claim 4, wherein the certain phase difference of the non-reciprocal phase shifter is expressed as follows:

$\phi_{TE} - \phi^f_{TM} = (2m+1)\pi$ ("m" is an integer) and $\phi_{TE} - \phi^b_{TM} = 2n\pi$ ("n" is an integer), in a case where a phase variation of the TN-mode to the forward propagating light is "$\phi_{TE}$", and a phase variation of the TM-mode to the forward propagating light is "$\phi^f_{TM}$", and in a case where a phase variation of the TE-mode to the backward propagating light is "$\phi_{TE}$", and a phase variation of the TM-mode to the backward propagating light is "$\phi^b_{TM}$".

* * * * *